United States Patent Office 2,811,017
Patented Oct. 29, 1957

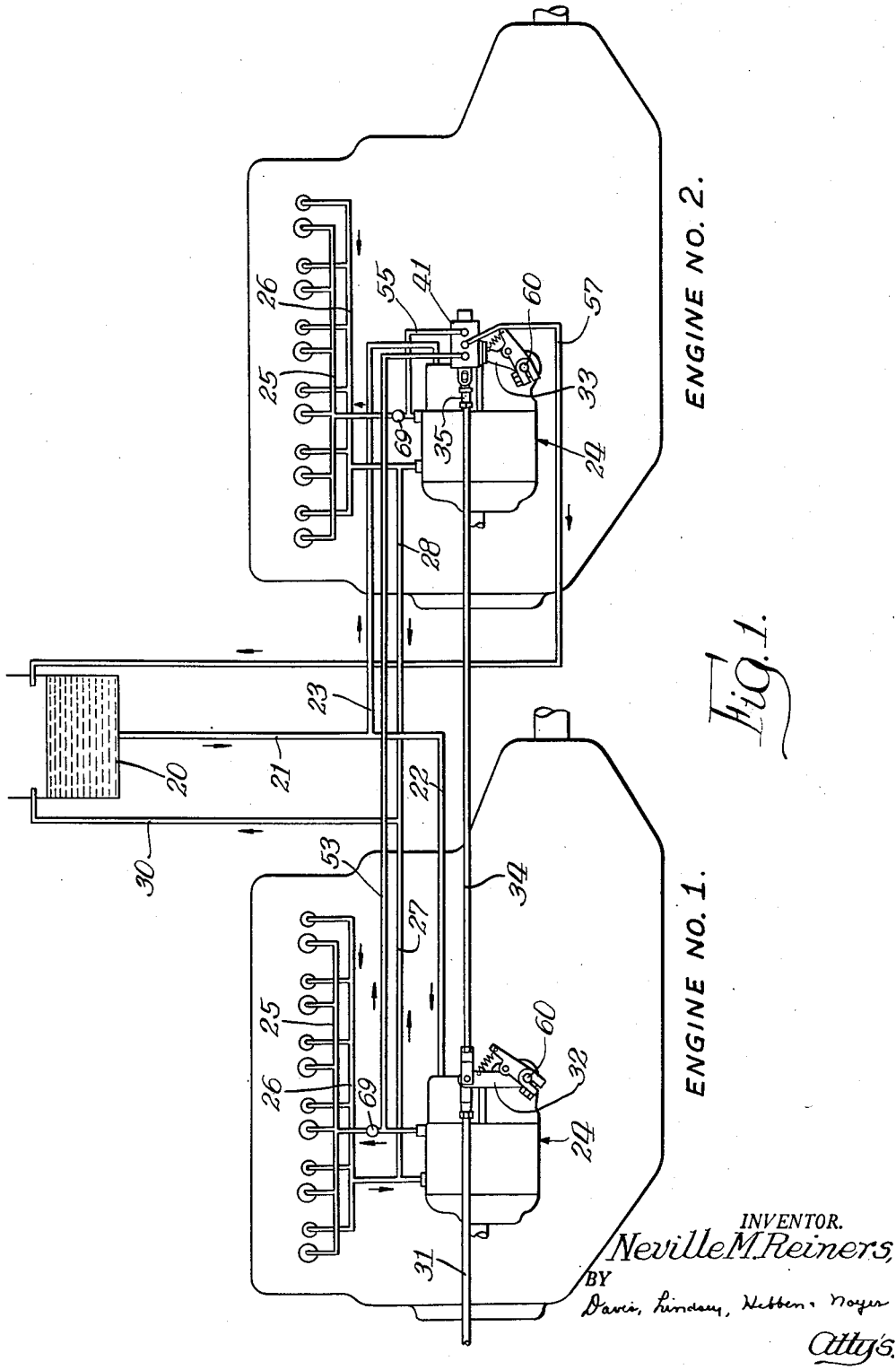

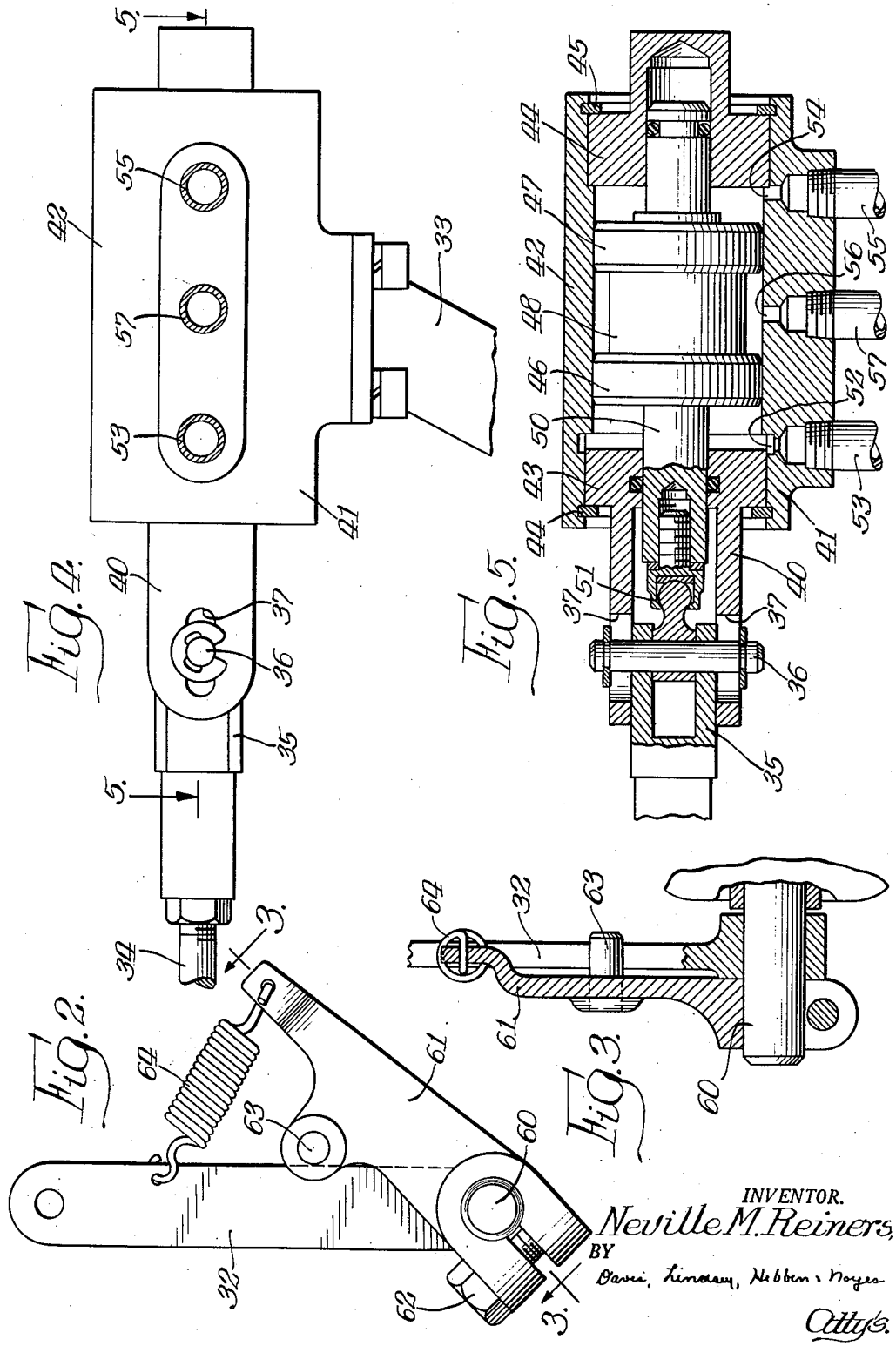

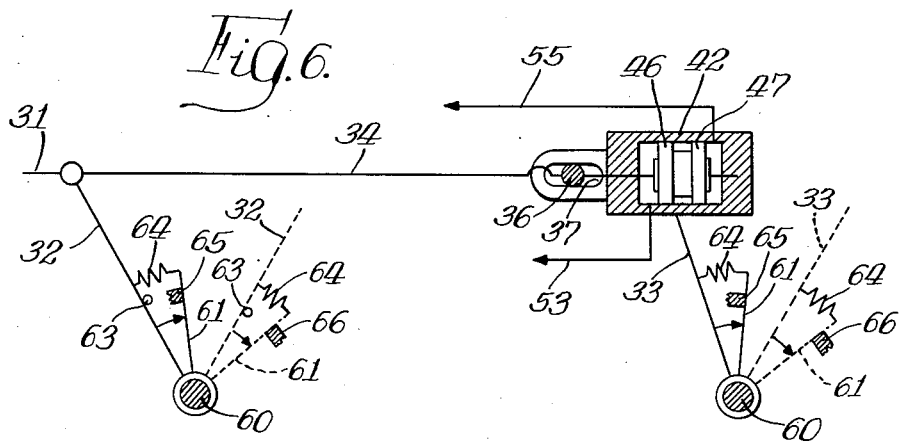
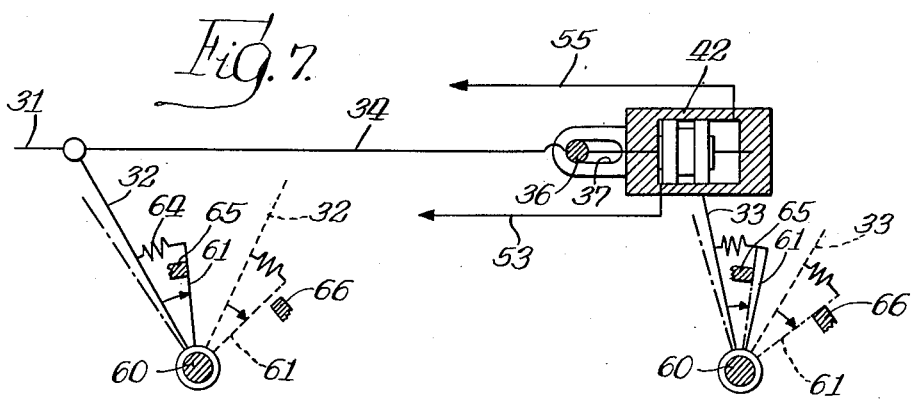
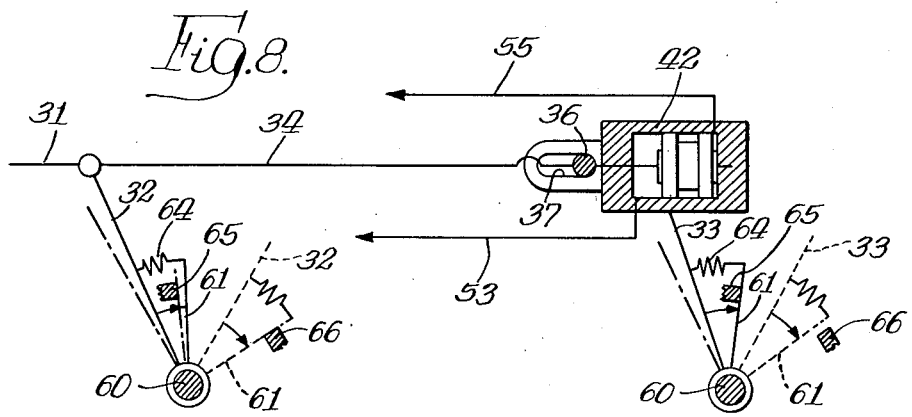

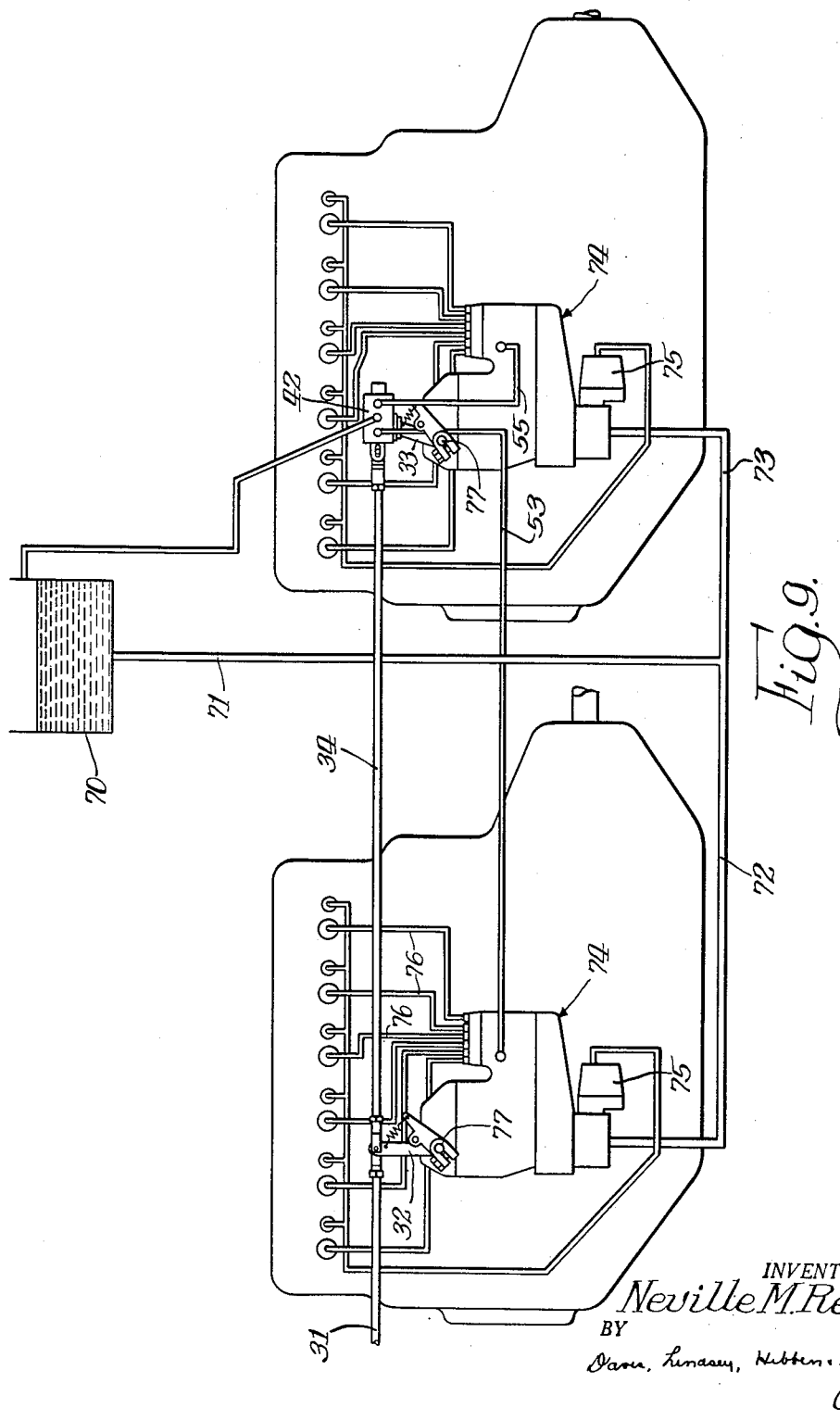

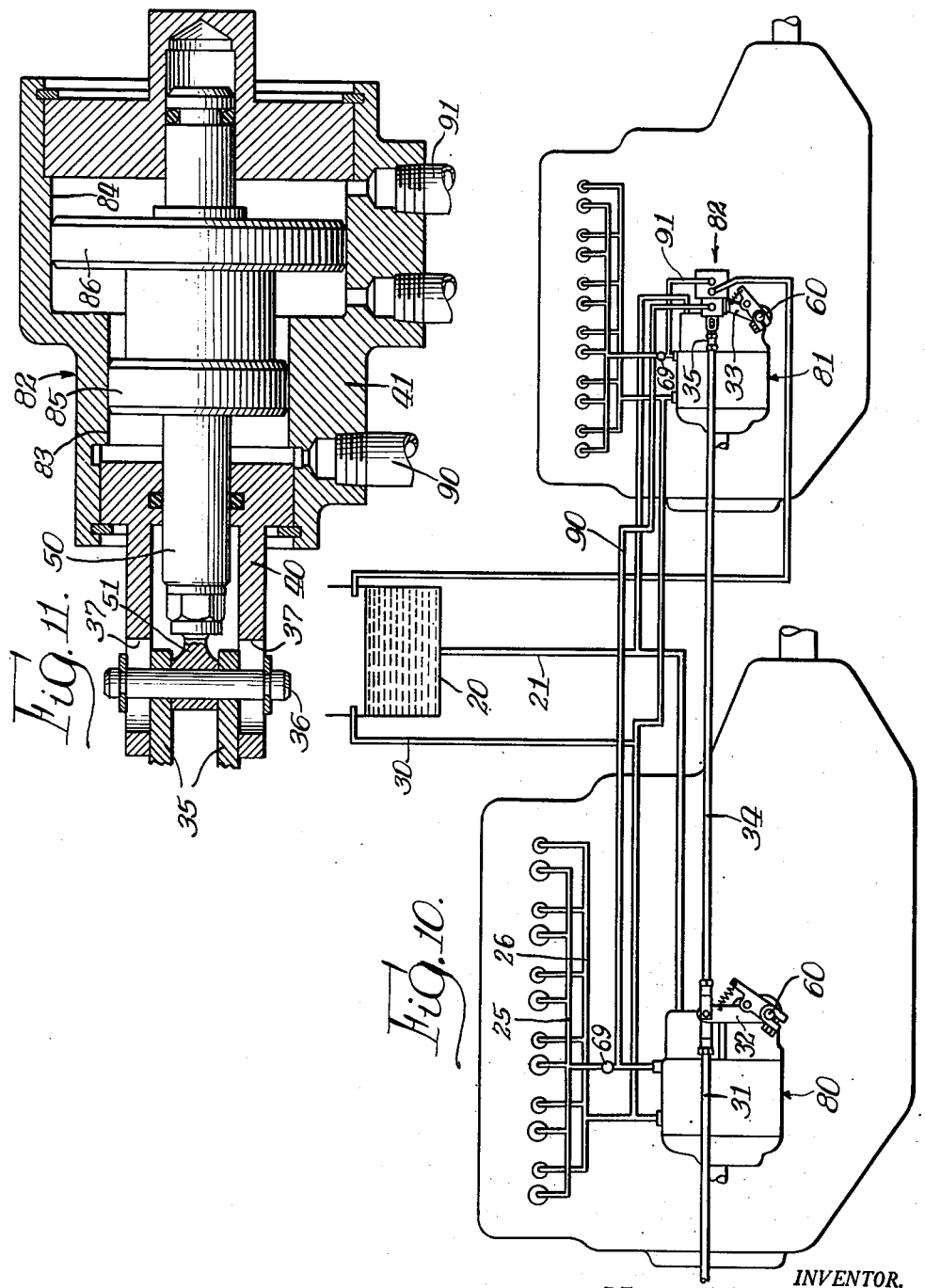

2,811,017

LOAD PROPORTIONING MEANS FOR MULTIPLE ENGINE INSTALLATIONS

Neville M. Reiners, Columbus, Ind., assignor to Cummins Engine Company, Inc., Columbus, Ind., a corporation of Indiana Application March 30, 1954, Serial No. 419,725

16 Claims. (Cl. 60—97)

The invention relates generally to multiple engine installations and more particularly to means for proportioning the load carried by the respective engines in such an installation.

The general object of the invention is to provide a novel means operable to proportion the load carried by the respective engines of a multiple engine installation comprising two or more engines.

Another object is to provide a novel means of the foregoing character, which is adapted for engines having drives rigidly connected together or without any such connection.

A further object is to provide a novel load proportioning means which permits each of the engines to be operated alone while the other engine or engines are stopped.

Still another object is to provide a novel load proportioning means permitting satisfactory operation at idling speed of either one or all of the engines of a multiple engine installation and with the engine drives rigidly connected or without a connection.

A still further object is to provide a novel load proportioning means permitting full overspeed governor control of the engine in a multiple engine installation under all conditions of operation.

Another object is to provide a novel load proportioning means adaptable for diesel engines having solid fuel injection systems of different constructions.

It is also an object to provide a novel load proportioning means which may be designed to cause the respective engines to carry any desired proportional part of the load.

Other objects and use will become apparent from the following description taken in connection with the accompanying drawings, in which Fig. 1 is an elevational view, partially diagrammatic, of two engines of the diesel type having fuel supply apparatus of the type shown in my copending application Serial No. 338,646, filed February 25, 1953, now patent No. 2,727,498, and having load proportioning means embodying the features of the invention;

Fig. 2 is an enlarged view of the throttle lever for the left-hand engine shown in Fig. 1;

Fig. 3 is a sectional view taken on the line 3—3 of Fig. 2;

Fig. 4 is an enlarged elevational view of the throttle lever and connected parts for the right-hand engine shown in Fig. 1;

Fig. 5 is a sectional view taken on the line 5—5 of Fig. 4;

Fig. 6 is a diagrammatic view showing the position of the throttle levers and connected parts when both engines are running;

Fig. 7 is a diagrammatic view of the position of the throttle levers and connected parts when the fuel suuply to the left-hand engine is cut off and the right-hand engine alone is operating;

Fig. 8 is a diagrammatic view showing the position of the thottle levers and connected parts of the two engines when the left-hand engine alone is operating and the fuel supply to the right-hand engine is cut off;

Fig. 9 is a view similar to Fig. 1 but showing the engines provided with fuel supply apparatus of the type shown in the Knudsen Patent No. 2,652,041 issued September 15, 1953;

Fig. 10 is a view similar to Fig. 1 but showing a multiple engine installation with load proportioning means where the engines are of different sizes; and Fig. 11 is a view similar to Fig. 5 but showing the load proportioning means utilized with the different size engines shown in Fig. 10.

To obtain variations in power delivered, it is frequently desirable to utilize two or more engines as a driving means. In such installations, if the two engines are of equal size, it is of course desirable that the load be equally proportioned between the engines. In other instances, it may be desirable to provide two or more engines of different size with each engine carrying a predetermined proportion of the load.

The drives of such engines may be rigidly connected together or in other instances they may not have any rigid connection with each other. An example of a rigid connection is where two engines and their drives are connected through gearing or the like to the same driven shaft. An example of where drives from the two engines have no connection with each other is in the case of a marine installation where each engine would be connected to the shaft for driving an individual screw. The drives from the two engines may be connected but in a non-rigid manner as in the case of two or more engines having their drives connected to a torque converter. The present load proportioning means is usable in any of the foregoing examples.

The present invention is adapted for use with different types of engines. Thus, it is adapted for use with diesel engines where the engine power is proportional to the fuel pressure. It is also usable with gasoline engines or turbo-charged diesel engines where the power is a function of the intake manifold pressure. In the case of diesel engines where the engine power is proportional to the fuel pressure, the present invention can also be adapted for use with different types of fuel systems for supplying fuel under pressure to the engine cylinders.

A load proportioning means embodying the features of the invention is capable of maintaining a predetermined proportion of the load on the respective engines throughout the speed range of the engines, and the engines will idle satisfactorily. The load proportioning means may be used with engines provided with either automotive type or tractor type fuel pump governors, and full overspeed governor control is permitted under all conditions of operation. Furthermore, it permits of single engine operation of either engine of the multiple installation at full or partial loads without necessitating any revision of the engine installation or control linkage.

To describe the invention, I have shown one embodiment thereof, in Figs. 1 to 8, applied to two engines of equal size, which in this instance are diesel engines provided with fuel supply apparatus of the type shown in my said copending application Serial No. 338,646, now Patent No. 2,727,498. For purposes of illustration, only two engines are shown but the invention is applicable to more than two engines by merely repeating the apparatus used. The two engines shown in these figures of the drawings do not indicate whether their drives are rigidly connected or are without any connection, since this fact does not affect the operation of the apparatus. Since two engines of equal size are shown in these figures, the apparatus is arranged to equally proportion the load between them.

In Fig. 1, I have labeled the left-hand engine as "Engine No. 1" and the right-hand engine as "Engine No. 2" to facilitate description of the apparatus. In this figure, the fuel for the engines is shown as being supplied from a tank 20 having a common supply line 21 provided with two branches 22 and 23 leading to the fuel supply apparatus, indicated generally at 24, of the respective engines. As disclosed in my copending application, the fuel supply apparatus 24 for each engine draws fuel from the tank 20 and supplies it to a common supply rail 25 under predetermined variable pressure. The common supply rail 25 is connected to injectors for the respective cylinders of the engine and each injector functions to inject a metered quantity of fuel into the cylinder during each cycle. A portion of the fuel supplied to the injectors flows therethrough and thence to a common return rail 26. The return rails of the two engines are connected to branch lines 27 and 28 which are in turn connected to a line 30 for returning the excess fuel to the fuel tank 20. Under certain conditions of operation, fuel may be pumped into the housing of each fuel supply apparatus 24, and such fuel is returned to the tank 20 by a connection from each housing to the branch return lines 27 and 28.

The operation of the load balancing means herein disclosed is based on the proposition that engine power is proportional to the pressure of a combustion fluid supplied to the cylinders of the engine. When the device is applied to a gasoline engine or a turbocharged diesel where the power delivered by the engine is a function of the air pressure in the intake manifold, the load proportioning means is connected to respond to such pressure. In the present instance where diesel engines are shown without any turbocharger and where the engine power is proportional to the pressure of the fuel supplied to the cylinders, the apparatus is connected so that it is responsive to such fuel pressures. Two engines of the same design will deliver substantially the same power when the pressures of the fuel supplied to the cylinders of the engines are substantially the same. The present apparatus causes the pressures of the fuel supplied to the respective engines to be equal so that the total load will be evenly proportioned between the engines. In the present instance, the pressures which are equalized are the pressures of the fuel in the common supply rails 25 of the respective engines.

In the embodiment of the invention shown in Figs. 1 to 8, the load proportioning means includes a control rod 31 which may be connected to or be a part of a manually operable master throttle (not shown). The control rod 31 is directly connected to the throttle lever of one of the engines and in this instance is shown as directly connected to the throttle lever 32 of Engine No. 1. The throttle lever for Engine No. 2 is shown at 33, and the two throttle levers are connected together by a lost motion connection so that when one of them is moved, the other will be moved to a less extent. Mounted on the throttle lever which is moved to such less extent is a pressure equalizing means connected to the common supply rails 25 of the respective engines for effecting further movement of the last mentioned throttle lever to the point where equal pressures will be provided in both supply rails. At this point, since the pressures of the fuel supplied to the respective engines are equal, the engines will carry equal loads.

In the present embodiment, the throttle levers 32 and 33 are connected together by a lost motion connection comprising a rod 34 directly connected at its left-hand end to the throttle lever 32. At its right-hand end, the rod 34 carries a yoke 35 having a transverse pin 36 mounted therein. The pin 36 at its ends is slidably mounted in elongated slots 37 of a second yoke 40 rigidly secured to a block 41 mounted rigidly on the throttle lever 33 of Engine No. 2.

As shown in Fig. 1 of the drawings, the throttle levers 32 and 33 are movable counterclockwise to increase the supply of fuel to the engines. Thus, when the master throttle is moved to increase the speed of the engines, the rod 31 moves the throttle lever 32 of Engine No. 1 to the same extent as the master throttle since the rod 31 is directly connected to the throttle lever 32. However, because of the pin and slot connection between the throttle levers 32 and 33, the throttle lever 33 will be moved to a less extent than the throttle lever 32. Consequently, the pressure of the fuel in the supply rail 25 of Engine No. 1 will be higher than the pressure of the fuel in the supply rail 25 for Engine No. 2.

The present invention provides means for effecting further movement of the throttle lever 33 until it reaches a position where the pressures in the two supply rails are equal. To this end, the block 41 includes a cylinder 42 closed at one end by a head 43 formed on the yoke 40. The head 43 is press-fitted into the cylinder 42 and is locked in place by a locking ring 44. The other end of the cylinder is closed by a head 44 locked in place by a locking ring 45. Within the cylinder 42 is a piston comprising two end portions 46 and 47 and a reduced central portion 48. The piston is mounted on a piston rod 50 which at its ends is slidably mounted in the heads 43 and 44. At its left-hand end, the piston rod 50 extends beyond the head 43 between the arms of the yoke 40 and has a universal connection 51 with the pin 36 to provide for the angular movement of the throttle lever 33. Thus, the piston will be moved to the same extent as the throttle lever 32 for Engine No. 1 through the rod 34.

The cylinder 42 is connected at its respective ends to receive fuel under pressure from the engines. For this purpose, the left-hand end of the cylinder 42 is provided with a port 52 connected to a line 53 leading to the connection from the fuel supply apparatus 24 to the common rail 25 of Engine No. 1. The right-hand end of the cylinder 42 is provided with a port 54 connected to a line 55 connected to the line extending from the fuel supply apparatus 24 to the common supply rail 25 for Engine No. 2. At its mid-point, the cylinder 42 is provided with a port 56 communicating with a line 57 extending to the fuel tank 20. Thus, any fuel leaking around the end portions 46 and 47 of the piston in the cylinder 42 will collect in the space provided by the reduced portion 48 of the piston and will pass out through the port 56 and line 57 for return to the fuel tank 20.

To explain the operation of the apparatus thus far described, when the master throttle is advanced, the throttle lever 32 for Engine No. 1 will be equally moved. The throttle lever 33 for Engine No. 2, however, will be moved to a less extent because of the lost motion connection provided by the pin 36 and the slot 37. Thus, when the throttle lever 32 is moved counterclockwise to increase the speed of the engine, the pin 36 will move freely to the left-hand end of the slots 37 and further movement of the throttle lever 32 will cause a movement of the throttle lever 33. The difference in extent of movement, however, is equal to the distance that the pin 36 moves in the slots 37, namely, from a central position, to the left-hand end of the slots 37. This difference in movement of the two throttle levers is such that the speed of Engine No. 2, due to the fact that its throttle lever 33 is moved to a less extent, is 25 to 50 R. P. M. lower than the speed of Engine No. 1.

This difference in setting of the two throttle levers results in a difference in pressures of the fuel supply to the two engines, the pressure of the fuel supplied to Engine No. 2 of course being lower. Since these pressures are applied to opposite ends of the piston in cylinder 42 through the lines 53 and 55, there will be a pressure differential between the respective ends of the cylinder 42 acting on the piston therein. The movement of the pin 36 to the left-hand end of the slots 37 also causes movement of the piston to the left-hand end of the cylinder 42 since the piston is connected to the pin by the universal connection 51. The pressure in the left-hand end, since this end is connected to Engine No. 1, is higher than the pressure in the right-hand end of the cylinder which is connected to Engine No. 2. Such pressure difference will effect relative movement between the piston and cylinder. However, since the position of the piston because of its connection with the throttle lever 32 through the rod 34 is fixed by virtue of the setting of the throttle lever 32, the pressure difference between the respective ends of the cylinder will cause movement of the cylinder to the left as shown in Fig. 5. Since the cylinder 42 is mounted on the throttle lever 33, such movement causes an advance of the throttle lever 33. Such movement continues until the pressures in the two ends of the cylinder are equalized. This occurs when the piston is midway between the ends of the cylinder and the pin 36 is midway between the ends of the slot 37. At this position, the throttle lever 33 has been moved to substantially the same extent as the throttle lever 32 to produce equal fuel pressures for the two engines. Thus, with such equal pressures of the fuel supplied to the cylinders of the engine, the engines will carry substantially equal loads.

It will be obvious from the foregoing that when both throttle levers have been adjusted by the means shown herein to cause the engines to carry equal loads, full governor control of each engine is obtained. The load on the two engines can be balanced by this means for the full throttle range of the engines and both will idle satisfactorily at substantially the same rail pressure.

The load proportioning means would operate similarly if the master throttle were connected to the throttle lever 33 of Engine No. 2. However, in that case, the throttle lever 32 of Engine No. 1 would be the one which is moved to a less extent and then is moved further because of the fuel pressures. Thus, if the throttle lever 33 were moved to a predetermined extent by the master throttle, the block 41 and yoke 40 would be equally moved but the rod 34 would not be moved until the pin 36 engaged the right-hand end of the slots 37. From then on, the throttle lever 32 of Engine No. 1 would move with the throttle lever 33 but the total movement of the throttle lever 32 would be less than the movement of the throttle lever 33 because of the space initially existing between the pin 36 and the right-hand end of the slots 37.

On such movement of the two throttle levers, the pressure in the right-hand end of the cylinder 42 would be higher than the pressure in the left-hand end of the cylinder since the difference in setting of the two throttle levers would result in a higher pressure for Engine No. 2 than for Engine No. 1. The movement of the block 40 and yoke 41 while the right-hand end of the slots 37 is moving toward the pin 36 results in movement of the cylinder 42 relative to the piston so that the end portion 47 of the piston will be located adjacent the head 44 of the cylinder and the space between the end portion 46 of the piston and the head 43 will be increased by a like amount.

However, with the higher pressure in the right-hand end of the cylinder, the pressure difference between the two ends will cause the piston to be moved to the left to effect further movement of the throttle lever 32 of Engine No. 1. Such relative movement between the piston and cylinder will be effected until the pressures in the supply rails 25 of the two engines, and consequently the pressures in the two ends of the cylinder, will be equal. At such time the throttle lever 32 will have been moved to substantially the same extent as the throttle lever 33 and because of the equal pressures of the fuel for both engines, they will carry equal parts of the load.

The control linkage for the two engines is adjustable by varying the effective length of the rod 34, the rod 34 being threaded in the yoke 35, so that the pin 36 will be centered in the slots 37 when both engines are pulling the same maximum load. As mentioned above, the length of the slot 37 and the consequent difference in movement of the throttle levers of the two engines is such that the speed of one engine will be 25 to 50 R. P. M. higher or lower than the other engine.

The throttle levers 32 and 33 of the respective engines are connected to the control or throttle shafts of the respective fuel supply apparatus by a yielding connection for purposes hereinafter discussed. Thus, as shown in Figs. 2 and 3, the throttle lever 32 is rotatably mounted on the throttle shaft indicated at 60. An intermediate or control lever 61 is also mounted on the throttle shaft 60 and is adapted to be clamped thereto by means of a bolt 62. The intermediate lever 61 carries a pin 63, and the throttle lever 32 is normally held in engagement with the pin 63 by a spring 64 connected at its ends to the respective levers. The spring 64 is of sufficient strength to cause the two levers 32 and 61 to move together under normal operation. The throttle lever 33 for Engine No. 2 has a similar connection with its throttle shaft 60.

In Fig. 6, I have illustrated diagrammatically the position of the parts when both engines are operating and they are carrying equal loads. In full lines in this figure, I have shown the full throttle position of the throttle lever 32 and its associated intermediate lever 61 for Engine No. 1 and the position of throttle lever 33 and its associated intermediate lever 61 for Engine No. 2. In dotted lines in this figure, I have shown the position of these parts when the two engines are operating at idling speed. Thus, considering the full line position of these parts, the throttle lever 32 is shown as being angularly spaced from its associated intermediate lever 31, which of course is due to the pin 63 and the fact that the spring 64 holds the throttle lever 32 against the pin and thus keeps the two levers in fixed relation to each other. At full throttle, the throttle shaft is limited against further movement by means which is here illustrated as a stop 65 abutting the intermediate lever 61 when the throttle 32 has been moved to full throttle position. Similarly the intermediate lever 61 associated with the throttle lever 33 for Engine No. 2 is shown as being in abutment with a stop 65 at full throttle position.

At idling speed position of the throttle shaft 60, there is another stop which is here illustrated as a stop 66 adapted to limit the movement of the intermediate lever 61 in the opposite direction as shown in dotted lines in Fig. 6. A similar stop is illustrated for the lever 61 of Engine No. 2. The throttle levers 32 and 33 have the dotted line positions shown in this figure at idling speed and are held in such position by the springs 64. The throttle shafts 60 of the two engines may be moved through the respective throttle levers 32 and 33 as hereinbefore described from an idle speed position to a full throttle position.

With a multiple engine installation, it is sometimes desirable to operate only one engine, with the fuel supply to the other engine cut off so that no load will be carried thereby. The above-described yieldable connection between the throttle levers 32 and 33 with their respective throttle shafts 60 provide for such operation. In Fig. 7 I have indicated the conditions that exist when the fuel supply to Engine No. 1 is cut off as by a valve 69 and no load is carried thereby, while Engine No. 2 is operating. Means, such as a valve 69, may be provided for cutting off the fuel supply to each of the engines.

For such mode of operation, the master throttle connection 31 is moved toward a maximum fuel position. Through the connection of the rod 34, the pin 36 is first moved to the left-hand end of the slot 37 and thereafter the throttle lever 33 of Engine No. 2 will be moved with it. Such movement of the rod 34 also causes the throttle lever 32 of Engine No. 1 to be moved, but when the intermediate lever 61 associated with throttle lever 32 engages the maximum fuel stop 65, the intermediate lever 61 associated with throttle lever 33 will not have moved into engagement with its maximum fuel stop 65 because of the lost motion provided between the pin 36 and the end of the slot 37. This movement also causes the piston within the cylinder 42 to be moved to the left-hand end of the cylinder as is illustrated in Fig. 7. With Engine No. 2 operating, the fuel pressure in the rail 25 of Engine No. 2 will be transmitted to the right-hand end of the cylinder 42. However, since Engine No. 1 is not operating and the fuel supply thereto is cut off, no pressure will exist in the left-hand end of the cylinder 42. Consequently the pressure differential will hold the piston firmly in place in the left end of the cylinder.

From the foregoing description, it will be seen that when the intermediate lever 61 associated with the throttle 32 of Engine No. 1 engages its maximum fuel stop 65, the intermediate lever 61 associated with the throttle lever 33 of Engine No. 2 will have a slightly lower setting not up to its maximum fuel stop 65. The yieldable connection between the throttle lever 32 and its associated intermediate lever 61 provided by the spring 64 provides the means whereby the intermediate lever 61 for Engine No. 2 may be moved up to maximum fuel position. Thus, by advancing the master throttle sufficiently to move the throttle lever 33 and its associated intermediate lever to maximum fuel position as indicated in dash-and-dot lines, the spring 64 connecting the throttle lever 32 of Engine No. 1 and its associated intermediate lever 61 will yield since the throttle lever 32 must move an additional amount as indicated by the dash-and-dot line but its associated intermediate lever 61 is prevented from such movement by its maximum fuel stop 65. Thus, Engine No. 2 may be operated at full throttle while the fuel supply to Engine No. 1 is cut off.

Under this condition, it will also be noted that Engine No. 2 is controlled directly by movement of the master throttle, the throttle lever of Engine No. 1 being movable but not affecting the operation since the fuel supply to Engine No. 1 is cut off.

For idling Engine No. 2 when the fuel supply to Engine No. 1 is cut off, the master throttle is shifted until the intermediate lever 61 associated with throttle lever 33 of Engine No. 2 engages its idle stop 66. This occurs before the intermediate lever 61 associated with throttle lever 32 of Engine No. 1 engages its idle stop 66, since the piston is in the left-hand end of the cylinder 42 and the pin 36 is in engagement with the left-hand end of the slot 37. This position of the parts is illustrated in dotted lines in Fig. 7. While the throttle lever 32 and its associated intermediate lever 61 are above their normal idle speed position, such fact is of no consequence since the fuel supply to Engine No. 1 is cut off.

When it is desired to operate Engine No. 1 alone, with the fuel supply to Engine No. 2 cut off, the position of the parts is shown in Fig. 8. For such operation, the master throttle 31 is moved to the left toward the "on" position. This movement is transmitted directly to throttle lever 32 for Engine No. 1. However, as soon as Engine No. 1 starts to operate, a pressure will be built up in the left-hand end of cylinder 42 but no pressure will exist in the right-hand end of the cylinder since the fuel supply is cut off to Engine No. 2. The piston will thus be moved to the right-hand end of the cylinder, and the pin 36 connected to the rod 34 will move to the right-hand end of the slot 37. Because of this relation between the piston and cylinder, the intermediate lever 61 associated with throttle lever 33 of Engine No. 2 will engage its maximum fuel stop 65 before the intermediate lever 61 associated with the throttle lever 32 of Engine No. 1 engages its maximum fuel stop. This condition of the parts is illustrated in full lines in Fig. 8.

To operate Engine No. 1 at full throttle under these conditions, the throttle lever is advanced until the intermediate lever 61 associated with throttle lever 32 engages its maximum fuel stop 65 as shown in dash-and-dot lines in Fig. 8. With such movement, the intermediate lever 61 associated with throttle lever 33 of Engine No. 2 is prevented from any further movement by its maximum fuel stop 65. However, the lever 33 can move relative to its intermediate lever 61 by yielding of the spring 64 connecting these two levers to the position shown in dash-and-dot line. Thus Engine No. 1 can be operated at full throttle while the fuel supply to Engine No. 2 is cut off.

For idling under these conditions, the master throttle is moved until the intermediate lever 61 associated with throttle lever 32 of Engine No. 1 engages its idle speed stop 66. But because the piston is in the right-hand end of the cylinder 42, the intermediate lever 61 associated with throttle lever 33 of Engine No. 2 will be slightly above its idle speed position and out of engagement with its idle speed stop 66. However, since the fuel supply to Engine No. 2 is cut off, such position of its throttle lever does not affect the operation.

As heretofore mentioned, I have shown in Fig. 9 the present load proportioning means when applied to a diesel engine provided with fuel supply apparatus of the type shown in the Knudsen Patent 2,652,041 issued September 15, 1953. As shown in this figure, fuel for the engines is supplied from a tank 70 through a line 71 having two branches 72 and 73 leading to the respective engines. The engines in this instance are shown as being of equal size. As described in said patent, fuel is drawn from the tank 70 by a gear pump embodied in the fuel supply apparatus indicated generally at 74. This fuel is pumped to a float tank 75 from which it is withdrawn by a second pump in the fuel supply apparatus. From the second pump, the fuel flows through the intake portion of a rotatably driven distributor to a metering pump which in the patent is illustrated as a piston type pump. The delivery side of the metering pump is connected by a passage leading to the delivery portion of the rotary distributor and then from such delivery portion to the respective cylinders through lines 76. The passage from the metering pump to the delivery portion of the distributor is indicated at 82 in such patent, and the pressure in such passage determines the amount of fuel delivered to the respective cylinders of the engine and consequently the power developed by the engine. Thus, by utilizing the load proportioning means of the present invention to adjust the throttle levers of two or more engines of this type so that the fuel pressures in the passages between the pumps and delivery portions of the distributors of the respective engines are equal, the two engines will carry substantially the same load. The throttle shafts for controlling the fuel supply apparatus of these engines are shown at 77 and throttle levers 32 and 33 of the same character as heretofore described are utilized to actuate the throttle shafts 77. The load proportioning means is exactly the same as has been heretofore described and is connected to the throttle levers 32 and 33 in the same manner. The two end portions of the cylinder 42 of the load proportioning means are connected by the lines 53 and 55 to the above-mentioned passages between the metering pumps and distributors of the respective engines. Thus, the load carried by two engines having the fuel supply apparatus of the character shown in said Knudsen patent may be equalized in the same manner as heretofore described.

In Figs. 10 and 11, I have shown a load proportioning means adapted for use with engines of different sizes and where the engines consequently will carry different proportions of the total load. By way of illustration, I have shown the left-hand engine of Fig. 10 as being the larger of the two. The fuel supply apparatus for these two engines is shown as being of the same type as is shown in Fig. 1. While it is assumed that the angular range of movement of the throttle levers for two engines of different size will be the same between the idling speed position and the full throttle position, the pressures of the fuel supply to the cylinders of the engines may of course differ for full throttle operation, the pressure of the fuel for the larger engine being assumed to be greater than the pressure of the fuel for the smaller of the two engines.

To describe this modification specifically, I have shown a fuel supply apparatus 80 for the larger engine and a fuel supply apparatus 81 for the smaller of the two engines. The throttle shafts for these two engines are shown at 60 and are similar to those heretofore described and have throttle levers 32 and 33 mounted thereon in the same manner as was disclosed in connection with Fig. 1. The throttle lever 32 of the larger engine may be directly connected to a master throttle by a rod 31 and a rod 34 is also connected thereto to extend to the smaller engine. The rod 34 is provided with a lost motion connection with the throttle lever 33 by means of a yoke 35 mounted on the end of the rod 34 and carrying the pin 36 mounted in the slots 37 of a second yoke 40 rigidly secured to the throttle lever 33 by a block 41. The latter (see Fig. 11) is provided with a cylinder in which is mounted a piston having a piston rod 50 extending beyond the left end of the cylinder and connected by a universal connection 51 with the pin 36.

The piston is adapted to be balanced between the ends of the cylinder to equalize the position of the throttle levers 32 and 33 of the respective engines. But, since the engines operate with different pressures in the fuel supplied to the cylinders of the respective engines, the piston and cylinder in this instance are constructed to compensate for such difference in pressures. Thus, the cylinder is shown generally at 82 and is provided with end portions of different size, the end portion at the left-hand end, indicated at 83, being smaller than the portion at the right-hand end, indicated at 84. Correspondingly, the piston is provided with a left-hand end portion 85 adapted to fit within the cylinder portion 83 and with a right-hand end portion 86 adapted to fit within the cylinder portion 84. The portion 83 of the cylinder is connected by a conduit 90 with the common fuel supply rail for the cylinders of the left-hand or larger engine so that the left end of the cylinder will be subjected to the higher pressure of the fuel from the larger engine. The right-hand end portion 84 of the cylinder is connected by a conduit 91 to the common fuel supply rail for the right-hand engine so that the right-hand portion 84 of the cylinder is subjected to the smaller fuel pressure of the smaller engine.

Since it is desired to balance the piston within the cylinder 82, when the two engines are carrying their proper proportions of the total load, the diameter of the portions 83 and 84 of the cylinder, and of the corresponding piston portions 85 and 86, are proportioned so that the total forces acting on opposite ends of the piston will be equal when the engines are carrying the desired proportion of the load. Thus, when the engines are respectively carrying the desired proportions of the total load, the force acting on the piston portion 85 will equal the fuel pressure in the common supply rail of the left-hand engine times the effective area of the piston portion 85, and the forces acting on the piston portion 86 will equal the pressure existing in the common supply rail of the right-hand or smaller engine times the effective area of the piston portion 86. By equalizing these two forces so that the piston will assume a midpoint position within the cylinder 82 when both engines are operating, the two throttle levers 32 and 33 of the respective engines will have substantially the same setting and the respective engines will carry the desired proportion of the load.

The same action in bringing one engine up to the point where it carries its proper proportion of the load in relation to that carried by the other engine will be exactly the same as has heretofore been described, and therefore such description need not be duplicated. Moreover, either of the engines may be operated while the fuel supply apparatus is cut off to the other engine in the same manner as has been discussed above.

From the foregoing description, it will be evident that I have provided a novel means operable to proportion the load carried by the respective engines of a multiple engine installation comprising two or more engines. The load proportioning means is adapted for use with engines having their drives rigidly connected together or without any such connection, and each engine may be operated alone while the other engine or engines are stopped. Satisfactory operation of the engines' idling speed is obtainable and full overspeed governor control of the engines is obtainable under all conditions of operations. Depending upon the size of engines utilized, the engines may carry equal loads or the device may be constructed so that the respective engines carry any desired proportional part of the total load.

I claim:

1. In a multiple engine installation comprising at least two multicylinder internal combustion engines, each of the type in which the power output of the engine is proportional to the pressure of a combustion fluid supplied to the cylinders of the engine and each having a throttle lever, a control member directly connected to one of the throttle levers, a connector extending from said one throttle lever and having a lost-motion connection for moving the other throttle lever part way, and means responsive to said pressures of the respective engines for moving said other throttle lever relative to said connector farther the same way.

2. In a multiple engine installation comprising at least two multicylinder internal combustion engines, each of the type in which the power output of the engine is proportional to the pressure of a combustion fluid supplied to the cylinders of the engine and each having a throttle lever, a control member directly connected to one of the throttle levers, and a pressure responsive device comprising a pair of elements having a connection permitting relative movement through a predetermined range, one element being connected to said one throttle lever for movement therewith and the other element being connected to said other throttle lever, said one element on movement thereof being movable relative to said other element to the limit of said range and thereafter moving said other element therewith, and said device being responsive to said pressures of the respective engines for moving said other element relative to said one element.

3. In a multiple engine installation comprising at least two multicylinder internal combustion engines, each of the type in which the power output of the engine is proportional to the pressure of a combustion fluid in a supply conduit connected to the cylinders and each having a throttle lever, a device comprising piston and cylinder elements connected to the respective throttle levers and being movable relative to each other through a limited range, each throttle lever on movement thereof moving relative to the other throttle lever to the limit of said range and thereafter moving the other throttle lever therewith, said cylinder element being connected on opposite sides of said piston element with the respective supply conduits to subject said piston element oppositely to the pressures in the respective conduits to move said other throttle lever to the extent of the first throttle lever.

4. In a multiple engine installation comprising at least two multicylinder internal combustion engines, each of the type in which the power output of the engine is proportional to the pressure of a combustion fluid in a supply conduit connected to the cylinders and each having a throttle lever, the throttle levers of the two engines having a lost-motion connection with each other whereby on movement of one throttle lever the other throttle lever will be moved to less extent, and a device comprising a piston and a cylinder connected through said lost-motion connection to the respective throttle levers, said cylinder being connected at opposite sides of said piston with the supply conduits of the respective engines to move said other throttle lever to a further extent.

5. In a multiple engine installation comprising at least two multicylinder internal combustion engines, each of the type in which the power output of the engine is proportional to the pressure of a combustion fluid in a supply conduit connected to the cylinders and each having a throttle lever, a slotted member connected to one throttle lever, a member connected to the other throttle lever and having a pin operating in the slot of the slotted member whereby on movement of one throttle lever the other throttle lever will be moved to a lower setting than the setting of said one throttle lever, a cylinder rigid with one of said members and a piston in said cylinder and rigid with the other of said members, said cylinder communicating at opposite sides of said piston with the supply conduits of the respective engines whereby the difference of said pressures of the respective engines at said settings effects relative movement of the piston and cylinder to move the throttle lever with the lower setting upward.

6. In a multiple engine installation comprising at least two multicylinder internal combustion engines, each of the type in which the power output of the engine is proportional to the pressure of a combustion fluid in a supply conduit connected to the cylinders and each having a throttle lever, a cylinder mounted on one throttle lever and having a longitudinally slotted member extending toward the other throttle lever from the end of the cylinder, a piston in said cylinder and having a piston rod connected with said other throttle lever, said rod having a pin operating in said slot to limit the relative movement between said cylinder and piston whereby on movement of one of the two throttle levers the other throttle lever will be moved to a lower setting than the setting of the one throttle lever, said cylinder communicating at opposite sides of said piston with the supply conduits of the respective engines whereby the difference of said pressures of the respective engines at said settings effects relative movement of the piston and cylinder to move the throttle lever with the lower setting upward.

7. In a multiple engine installation comprising at least two multicylinder internal combustion engines, each of the type in which the power output of the engine is proportional to the pressure of a combustion fluid in a supply conduit connected to the cylinders and each having a throttle lever, a cylinder mounted on one throttle lever and having a pair of spaced longitudinally slotted arms extending toward the other throttle lever from the end of the cylinder, a piston in said cylinder and having a piston rod extending from said end of the cylinder between said arms, a connecting rod extending from said other throttle lever and having a universal connection with said piston rod and carrying a transverse pin operating in the slots in said arms, whereby on movement of one of the two throttle levers the other throttle lever will be moved to a lower setting than the setting of one throttle lever, said cylinder communicating at opposite sides of said piston with the supply conduits of the respective engines whereby the difference of said pressures of the respective engines at said settings effects relative movement of the piston and cylinder to move the throttle lever with lower setting upward.

8. In a multiple engine installation comprising at least two multicylinder internal combustion engines, each of the type in which the power output of the engine is proportional to the pressure of a combustion fluid in a supply conduit connected to the cylinder and each having a throttle lever, the throttle levers of the two engines having a lost-motion connection with each other whereby on movement of one throttle lever the other throttle lever will be moved to less extent, and a device comprising a piston and a cylinder connected through said lost-motion connection to the respective throttle levers, said cylinder being connected at opposite sides of said piston with the supply conduits of the respective engines whereby the difference of said pressures of the respective engines effects relative movement of the piston and cylinder to move said other throttle lever to a further extent, said piston having a reduced portion intermediate its sides and said cylinder having a discharge passage connected to the space provided by said reduced portion to prevent the fluid at one side of said piston from leaking into the other side.

9. The combination of two multicylinder internal combustion engines, each having a common rail for supplying fuel to the cylinders, engine-driven means for supplying fuel under pressure to said rail, and a throttle lever for controlling the flow of fuel from said means to said rail, the throttle levers of the two engines having a lost-motion connection with each other whereby on movement of one throttle lever the other throttle lever will be moved to a less extent, and a device comprising a piston and a cylinder connected to the respective throttle levers, a pair of conduits respectively connected to said cylinder at opposite sides of said piston and connected to the rails of the respective engines, whereby the difference of the pressures of the fuel in the respective rails effects relative movement of said piston and cylinder to move said other throttle lever to a further extent.

10. The combination of two multicylinder internal combustion engines, each having fuel supply apparatus for supplying fuel under pressure to the respective cylinders, and a throttle lever for controlling the flow of fuel in said apparatus, the throttle levers of the two engines having a lost-motion connection with each other whereby on movement of one throttle lever the other throttle lever will be moved to a less extent, and a device comprising a piston and a cylinder connected to the respective throttle levers, a pair of conduits respectively connected to said cylinder at opposite sides of said piston and connected to said discharge passages of the respective engines, whereby the difference of the pressures of the fuel in the respective discharge passages effects relative movement of said piston and cylinder to move said other throttle lever to a further extent.

11. In a multiple engine installation comprising at least two multicylinder internal combustion engines, each of the type in which the power output of the engine is proportional to the pressure of a combustion fluid in a supply conduit connected to the cylinders, each engine having a fuel control shaft, a throttle lever for turning said control shaft and a maximum fuel stop for limiting movement of said control shaft, the throttle levers of the two engines having a lost-motion connection with each other whereby on movement of one throttle lever the other throttle lever will be moved to less extent, and a device comprising a piston and a cylinder connected through said lost-motion connection with the respective throttle levers, said cylinder being connected at opposite sides of said piston with the supply conduits of the respective engines whereby the difference of said pressures of the respective engines when both are operating effects relative movement of the piston and cylinder to move said other throttle lever to a further extent, the throttle lever and control shaft of each engine moving with each other when both engines are operating but having a yieldable connection whereby when the fuel supply of one engine is cut off and the other engine is operating at maximum fuel the yieldable connection is adapted to yield to permit the throttle lever of the engine having its fuel supply cut off to be moved beyond its maximum fuel position by said piston and cylinder device.

12. In a multiple engine installation comprising at least two multicylinder internal combustion engines, each of the type in which the power output of the engine is proportional to the pressure of a combustion fluid in a supply conduit connected to the cylinders, each engine having a fuel control shaft, a control lever rigidly mounted on said shaft, a throttle lever rotatably mounted on said shaft, a spring connecting the two levers, and a maximum fuel stop for limiting movement of said control lever, the throttle levers of the two engines having a lost-motion connection with each other whereby on movement of one throttle lever the other throttle lever will be moved to less extent, and a device comprising a piston and a cylinder connected through said lost-motion connection with the respective throttle levers, said cylinder being connected at opposite sides of said piston with the supply conduits of the respective engines whereby the difference of said pressures of the respective engines when both are operating effects relative movement of the piston and cylinder to move said other throttle lever to a further extent, said spring of each engine holding the throttle lever and control lever thereof for movement with each other when both engines are operating, and when the fuel supply of one engine is cut off and the other engine is operating at maximum fuel, said spring of the engine having its fuel supply cut off yielding to permit its associated throttle lever to be moved beyond its maximum fuel position by said piston and cylinder device.

13. In a multiple engine installation comprising at least two multicylinder internal combustion engines, each of the type in which the power output of the engine is proportional to the pressure of a combustion fluid in a supply conduit connected to the cylinders, each engine having a fuel control shaft, a control lever rigidly mounted on said shaft, a throttle lever rotatably mounted on said shaft, a spring connecting the two levers, and a maximum fuel stop for limiting movement of said control lever, the throttle levers of the two engines having a lost-motion connection with each other whereby on movement of one throttle lever the other throttle lever will be moved to less extent, and a device connected to the supply conduits of the two engines and responsive to the difference in pressures therein when both engines are operating for moving said other throttle to a further extent, said spring of each engine holding the throttle lever and control lever thereof for movement with each other when both engines are operating, and when the fuel supply for one engine is cut off and the other engine is operating at maximum fuel, said spring of the engine having its fuel supply cut off yielding to permit its associated throttle lever to be moved beyond its maximum fuel position by said device.

14. In a multiple engine installation comprising at least two multicylinder internal combustion engines, each of the type in which the power output of the engine is proportional to the pressure of a combustion fluid in a supply conduit connected to the cylinders and each having a throttle lever, a device comprising a cylinder connected to one throttle lever and having a portion at one end of one diameter and a portion at the other end of a different diameter, and a piston member connected to the other throttle lever and having piston elements fitting the respective portions of said cylinder, said piston member and cylinder being movable relative to each other through a limited range whereby each throttle lever on manual movement thereof is movable relative to the other throttle lever to the limit of said range and thereafter effecting movement of said other throttle lever therewith, said cylinder having its end portions connected to the supply conduits of the respective engines to subject said piston elements to the pressures therein to effect further movement of said other throttle lever.

15. In a multiple engine installation comprising two multicylinder internal combustion engines, each of the type in which the power output of the engine is proportional to the pressure of a combustion fluid in a supply conduit connected to the cylinders and each having a throttle lever, the two engines being of different capacities and said pressures for the respective engines normally differing throughout the speed range of the engines, a lost-motion connection between the throttle levers of the two engines whereby on movement of one throttle lever the other throttle lever will be moved to less extent, and a piston and cylinder device having the piston and cylinder connected through said lost-motion connection to the respective throttle levers, said piston and cylinder device having different effective diameters at its respective ends with the end having the larger diameter connected to the supply conduit of the smaller engine and the end having the smaller diameter connected to the supply conduit of the larger engine whereby the difference in said pressures effects relative movement of the piston and cylinder to move the throttle lever of said other engine to a further extent.

16. In a multiple engine installation comprising two multicylinder internal combustion engines, each of the type in which the power output of the engine is proportional to the pressure of a combustion fluid in a supply conduit connected to the cylinders and each having a throttle lever, the two engines being of different capacities and said pressures for the respective engines normally differing throughout the speed range of the engines, a lost-motion connection between the throttle levers of the two engines whereby on movement of one throttle lever the other throttle lever will be moved to less extent, and a device for moving said other throttle lever to a further extent to equal the extent of movement of said one throttle lever whereby said engines will carry the same proportion of load as the ratio of their respective capacities, said device comprising means responsive to differences in said pressures greater than the normal difference thereof.

References Cited in the file of this patent

UNITED STATES PATENTS

| | | |
|---|---|---|
| 2,429,390 | Case | Oct. 21, 1947 |
| 2,452,064 | Mayrath | Oct. 26, 1948 |